No. 733,370. PATENTED JULY 14, 1903.
W. G. CALLENDER.
SHOE BLACKING DEVICE.
APPLICATION FILED APR. 29, 1903.
NO MODEL.
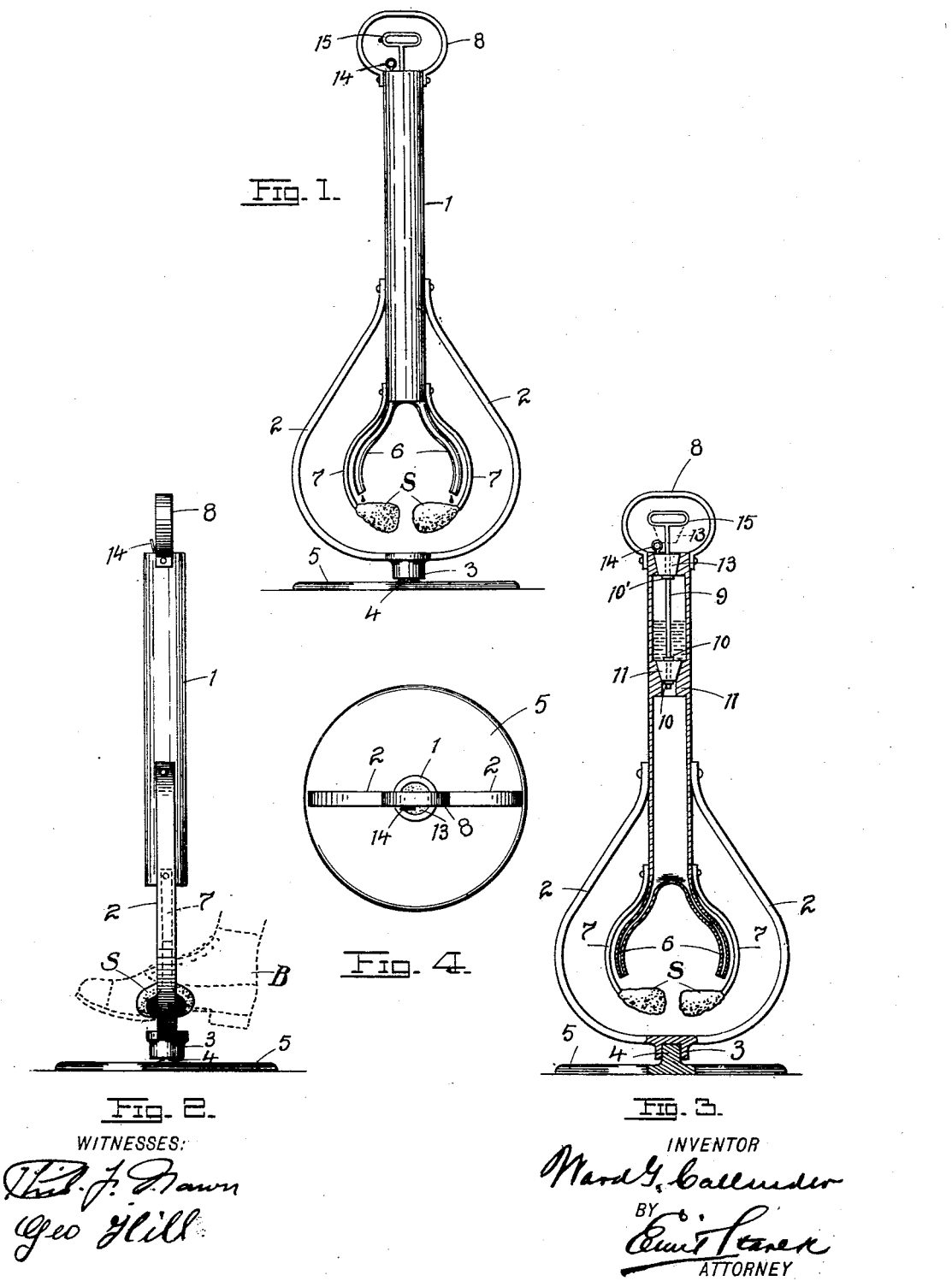

No. 733,370. Patented July 14, 1903.

UNITED STATES PATENT OFFICE.

WARD G. CALLENDER, OF PLAINFIELD, IOWA.

SHOE-BLACKING DEVICE.

SPECIFICATION forming part of Letters Patent No. 733,370, dated July 14, 1903.

Application filed April 29, 1903. Serial No. 154,821. (No model.)

*To all whom it may concern:*

Be it known that I, WARD G. CALLENDER, a citizen of the United States, residing at Plainfield, in the county of Bremer and State of Iowa, have invented certain new and useful Improvements in Shoe-Blacking Devices, of which the following is a full, clear, and exact description, reference being had to the accompanying drawings, forming a part hereof.

My invention has relation to improvements in shoe-blacking devices; and it consists in the novel arrangement and combination of parts more fully set forth in the specification and pointed out in the claims.

In the drawings, Figure 1 is a front elevation of my invention. Fig. 2 is an edge view thereof. Fig. 3 is a middle vertical section of the same, and Fig. 4 is a top plan view thereof.

The object of my invention is to construct a device which will deliver liquid blacking to a series of sponges or equivalent absorbing material to be applied to the shoe, the device being characterized by simplicity of construction, cheapness, and durability.

In detail the invention may be described as follows:

Referring to the drawings, 1 represents a tubular receptacle or holder provided with a frame 2, enveloping the lower end thereof, the base of the frame 2 having a socket 3 for receiving a pin or peg 4 of a suitable base-plate or platform 5. The latter, as presently will be seen, serves not only as a support for the blacking device, but prevents the dripping of the blacking on the floor or carpet. Leading from the bottom of the receptacle 1 are depending delivery-tubes 6 6, whose lower open ends are superposed over the sponges S S, carried at the free ends of the resilient arms or springs 7 7, secured to the receptacle 1. The upper end of the latter is provided with a loop or holder 8, by which it may be carried. Operating through the upper open end of the receptacle is a valve-stem 9, at the lower end of which there is confined between two collars 10 10 a conical plug or valve 11, the inner wall of the receptacle being provided with a valve-seat 12 for said valve. Slidingly mounted on the stem 9 above a collar 10' is a plug 13, which can be raised or lowered by an eye or loop 14 at pleasure. Normally the plug 11 is seated, and when liquid blacking is introduced into the receptacle into the space above said plug 11 the latter prevents the liquid from escaping. To introduce the liquid, the upper plug is raised sufficiently to permit the introduction thereof into the receptacle, after which it is forced down along the stem until the end of the receptacle is closed. The person blacking the shoes now raises the stem 9 by the handle 15 sufficiently to unseat the valve 11, when enough of the liquid will flow past the valve down the receptacle and through the delivery-tubes 6 6, feeding the sponges S S, between which the shoe B can be passed until the necessary portion thereof is covered with blacking.

It is of course apparent that I may depart from the details here shown without affecting the nature or spirit of my invention.

Having described my invention, what I claim is—

1. A shoe-blacking device comprising a tubular receptacle, delivery-tubes at the lower end thereof, resilient arms carried by the receptacle, sponges at the free ends of the arms located below the delivery ends of the tubes, and means for regulating the flow of the blacking from the receptacle to the delivery-tubes, substantially as set forth.

2. A shoe-blacking device comprising a tubular receptacle, delivery-tubes at the lower end thereof, resilient arms carried by the walls of the receptacle, sponges at the free ends of the arms located between the free ends of the delivery-tubes, a valve-stem projecting through the upper end of the receptacle, a valve at the lower end of the stem, a seat for said valve carried by the inner walls of the receptacle, a sliding plug at the upper end of the stem adapted to close the upper end of the receptacle, and means for actuating the stem from the outside of the receptacle, substantially as set forth.

3. In a shoe-blacking device, a tubular receptacle, adapted to deliver liquid blacking from the lower end thereof, a frame carried by the receptacle, a socket at the base of the frame, and a base or platform having a pin for engaging said socket, substantially as set forth.

In testimony whereof I affix my signature in presence of two witnesses.

WARD G. CALLENDER.

Witnesses:
O. A. SAPPER,
W. C. KILLEE.